W. J. CRUTCHER.
RUG HOLDER.
APPLICATION FILED FEB. 7, 1913.
1,112,775.
Patented Oct. 6, 1914.
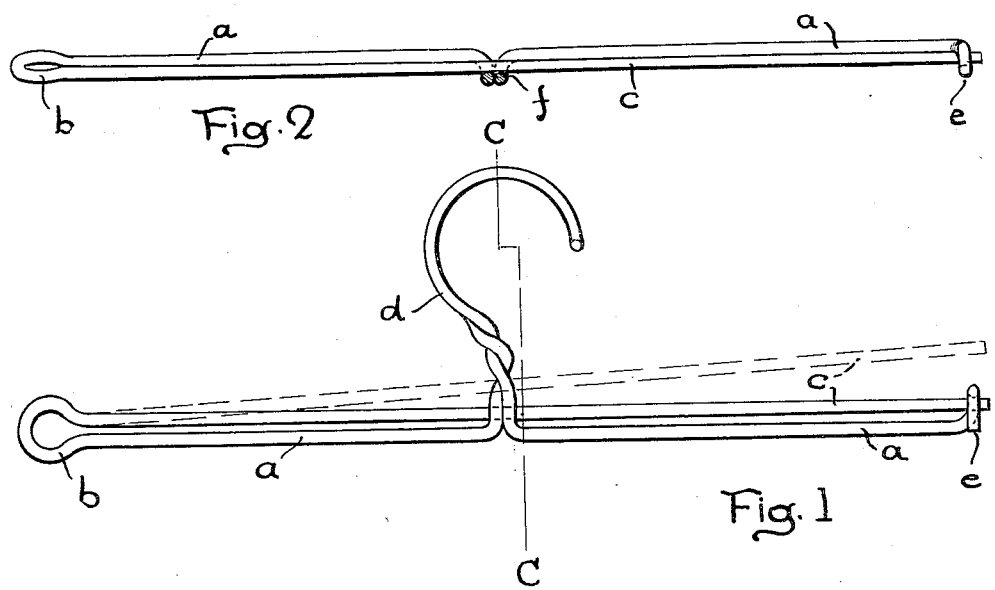
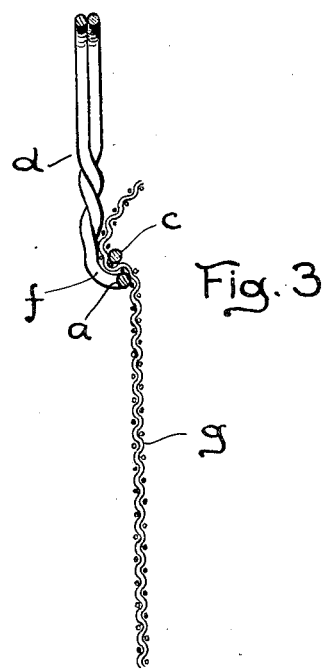

UNITED STATES PATENT OFFICE.

WILLIAM JEFFERSON CRUTCHER, OF HOLDEN, WEST VIRGINIA.

RUG-HOLDER.

1,112,775.  Specification of Letters Patent.  Patented Oct. 6, 1914.

Application filed February 7, 1913. Serial No. 746,733.

*To all whom it may concern:*

Be it known that I, WILLIAM JEFFERSON CRUTCHER, a citizen of the United States, residing at Holden, county of Logan, State of West Virginia, have invented a certain new and useful Improvement in Rug-Holders, and declare the following to be a full, clear, and exact description of the same, such as will enable others skilled in the art to which it pertains to make and use the same, reference being had to the accompanying drawings, which form a part of this specification.

My invention relates to holders for rugs and my improvement has for its object to provide an improved and cheap holder in which the rug may be readily inserted and when so inserted will be firmly held. I secure this object in the device illustrated in the accompanying drawing, in which, Figure 1, is a vertical elevation of a device embodying my invention. Fig. 2, is a plan view of the same. Fig. 3, is a section on the line C—C Fig. 1, looking from the right of said line.

$a$, $a$ indicate the portions of a wire rod, or bar, that remain in their original position when the device is constructed. Between the portions $a$, $a$ at their adjacent ends, the bar is bent in a loop outward and twisted and then bent over to form a suspending hook $d$. The loop forming the hook $d$ has the portion at the lower end of the shank of said hook bent outward and upward, as indicated at $f$ (Fig. 3).

The first portion $a$ of the bar, or rod, is bent to form a hook $e$ in a plane at right angles to the plane of the portions $a$, $a$ and having its bent portion parallel and co-axial with the bent portion $f$ of the hook $d$. The second portion $a$ is bent back upon itself in a manner to form a loop $b$ and then extends parallel to the original portions $a$, $a$ in a part $c$ forming a tongue, the outer and free end of which is adapted to be bent under and secured in the hook $e$, so that the portion $c$ shall be approximately at the center of the bend $f$ of the shank of the hook $d$, as shown in Fig. 3.

$g$, indicates the rug.

The operation of the above described device is as follows: The part $e$ being released, as indicated in dotted lines, the end of the rug is inserted between the parts $a$, $a$ and $c$ upon the side opposite to the hook $d$. The part $c$ is then bent inward and secured in the hook $e$ thus crimping the rug over the part $a$, as shown in Fig. 3 and holding it securely by the resilient pressure of the part $c$.

What I claim is:—

A holder made of a single rod having its end bent into the form of a hook $e$, a loop formed intermediate its ends and twisted and bent to form a suspending hook, and then bent back upon itself to be secured in the hook $e$, said suspending hook beng bent outward and upward at the lower part of its shank and the first mentioned hook being so located that it shall hold the rebent portion of the rod in position to crimp the suspended article into the said bend of the shank of the suspending hook.

In testimony whereof, I sign this specification in the presence of two witnesses.

WILLIAM JEFFERSON CRUTCHER.

Witnesses:
F. P. MENAGER,
WM. R. HARRINGTON.